US008460782B2

(12) United States Patent
Ivanov et al.

(10) Patent No.: US 8,460,782 B2
(45) Date of Patent: Jun. 11, 2013

(54) ARRAY OF ALIGNED AND DISPERSED CARBON NANOTUBES AND METHOD OF PRODUCING THE ARRAY

(75) Inventors: Ilia N Ivanov, Knoxville, TN (US); John T Simpson, Clinton, TN (US); Troy R Hendricks, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 13/472,928

(22) Filed: May 16, 2012

(65) Prior Publication Data
US 2012/0321841 A1    Dec. 20, 2012

Related U.S. Application Data (62) Division of application No. 12/642,166, filed on Dec. 18, 2009, now Pat. No. 8,202,749.

(51) Int. Cl.
*B32B 27/04* (2006.01)
*B32B 27/12* (2006.01)
*B32B 18/00* (2006.01)

(52) U.S. Cl.
USPC ............ 428/297.4; 428/298.1; 428/299.1; 257/E21.09; 257/E21.502; 977/479; 977/750; 977/873

(58) Field of Classification Search
USPC ............ 257/E21.09, E21.502; 977/479, 750, 977/843; 428/297.4, 298.1, 299.1
See application file for complete search history.

(56) References Cited

U.S. PATENT DOCUMENTS

| | | | |
|---|---|---|---|
| 2,263,601 A | 11/1941 | Wendler | |
| 3,294,504 A | 12/1966 | Hicks, Jr. | |
| 3,483,072 A | 12/1969 | Cox et al. | |
| 3,903,353 A | 9/1975 | Pirooz | |
| 5,045,526 A | 9/1991 | Nagesh et al. | |
| 5,229,357 A | 7/1993 | Onishi et al. | |
| 5,240,066 A | 8/1993 | Gorynin et al. | |
| 6,478,997 B2 | 11/2002 | McCullough | |
| 6,515,339 B2* | 2/2003 | Shin et al. .................. | 257/368 |
| 7,102,242 B2 | 9/2006 | Brix et al. | |
| 7,238,415 B2 | 7/2007 | Rodriguez et al. | |
| 7,254,963 B2 | 8/2007 | Deprot et al. | |
| 7,292,758 B2 | 11/2007 | Bayindir et al. | |
| 7,295,734 B2 | 11/2007 | Bayindir et al. | |
| 2002/0185770 A1 | 12/2002 | McKague | |
| 2005/0053345 A1 | 3/2005 | Bayindir et al. | |
| 2007/0019917 A1 | 1/2007 | Bayindir et al. | |
| 2007/0092716 A1* | 4/2007 | Guo et al. .................. | 428/323 |
| 2007/0131266 A1 | 6/2007 | Dutta | |
| 2007/0131269 A1 | 6/2007 | Dutta | |
| 2007/0245774 A1 | 10/2007 | Dutta | |
| 2008/0087047 A1 | 4/2008 | Bayindir et al. | |
| 2008/0138571 A1 | 6/2008 | Sazio et al. | |
| 2008/0142075 A1* | 6/2008 | Reddy et al. .................. | 136/257 |
| 2008/0169016 A1 | 7/2008 | Dutta | |

(Continued)

*Primary Examiner* — Mohsen Ahmadi
(74) *Attorney, Agent, or Firm* — Brinks Hofer Gilson & Lione (57) ABSTRACT

An array of aligned and dispersed carbon nanotubes includes an elongate drawn body including a plurality of channels extending therethrough from a first end to a second end of the body, where the channels have a number density of at least about 100,000 channels/mm$^2$ over a transverse cross-section of the body. A plurality of carbon nanotubes are disposed in each channel, and the carbon nanotubes are sufficiently dispersed and aligned along a length of the channels for the array to comprise an average resistivity per channel of about 9700 Ωm or less.

10 Claims, 9 Drawing Sheets

U.S. PATENT DOCUMENTS

| | | |
|---|---|---|
| 2008/0182317 A1 | 7/2008 | Maquin et al. |
| 2008/0254206 A1 | 10/2008 | Perera et al. |
| 2009/0240271 A1 | 9/2009 | Britton et al. |
| 2011/0248243 A1* | 10/2011 | Chen et al. ............ 257/29 |

* cited by examiner

Fig. 2D　　　　　Fig. 2H　　　　　Fig. 2L
1　　　　　　　　140　　　　　　　19,600
CNT channel　　　CNT channels　　CNT channels
Diameter: 150 um　Diameter: 7.67 um　Diameter: .392 um

ARRAY OF ALIGNED AND DISPERSED CARBON NANOTUBES AND METHOD OF PRODUCING THE ARRAY

RELATED APPLICATION

The present patent document is a division of U.S. patent application Ser. No. 12/642,166, filed on Dec. 18, 2009, which is hereby incorporated by reference in its entirety.

FEDERALLY SPONSORED RESEARCH OR DEVELOPMENT

This invention was made with government support under Contract No. DE-AC05-00OR22725 awarded by the U.S. Department of Energy. The government has certain rights in the invention.

TECHNICAL FIELD

The present disclosure is related generally to carbon nanotubes and more particularly to a method for aligning and dispersing carbon nanotubes in arrays.

BACKGROUND

Carbon nanotubes (CNTs) are molecules made of pure carbon with a chemical structure similar to rolled sheets of graphite, typically with one end capped. The tubes typically have diameters on the order of a few to a few hundred nanometers, while their length can be up to a few micrometers. Due to the unique structure of CNTs, they have excellent physical, electrical, mechanical and chemical properties that make them suitable for many different applications. For example, CNTs may be the most efficient material for field emission.

Field emission displays (FEDs) are an emerging and rapidly developing flat panel display technology developed as an alternative to bulky cathode ray tube (CRT) displays. FEDs have the advantages of low weight and a thin profile, similar to liquid crystal displays (LCDs), combined with a wide viewing angle, high brightness, and low energy consumption.

Typically, FEDs have a triode structure consisting of an anode, cathode and gate electrode. In conventional FED processing, a fluorescent material is formed on an anode substrate, and an electron-emitting source with a discharge tip is formed on a cathode substrate facing the anode substrate. A gate electrode and an insulating layer are also formed on the cathode substrate, with openings through the gate electrode and insulating layer for the discharge tips. By applying a voltage to the gate electrode, electrons are released from the discharge tips and are accelerated toward the anode substrate to strike the fluorescent material (e.g., red, blue and green phosphors), resulting in light emission from the phosphors. A thousand discharge tips may compose a single pixel on the display. Traditionally, molybdenum has been employed as the electron-emitting source and fabricated into discharge tips, despite various processing and cost issues. Discharge tips formed from CNTs are being investigated as a possible alternative.

Despite their excellent properties and potential applications, CNTs are plagued by processing challenges that may limit commercial usage of these materials. For example, CNTs are difficult to align or disperse due to their strong affinity for each other, which is caused by van der Waal forces. Pure CNTs are long ropelike molecules that may be disordered and intertwined with each other, resembling a plate of nanoscale spaghetti. In an attempt to produce vertically aligned carbon nanotube arrays, CNTs have been grown from metal catalysts or seed particles (e.g., nickel) patterned on a substrate. Such CNTs may be difficult to produce and to activate individually, however, since the CNTs tend to clump together.

To exploit the properties of the CNTs in high definition displays and other electronic devices, it would be advantageous to develop a method to evenly disperse and align the nanotubes.

BRIEF SUMMARY

An array of aligned and dispersed carbon nanotubes and a method of making such an array are described.

The array includes an elongate drawn body including a plurality of channels extending therethrough from a first end to a second end of the body, where the channels have a number density of at least about 100,000 channels per square millimeter over a transverse cross-section of the body. A plurality of carbon nanotubes are disposed in each of the channels, and the carbon nanotubes are sufficiently dispersed and aligned along a length of the channels for the array to comprise an average resistivity per channel of about 9700 $\Omega$m or less.

The method entails mixing a plurality of carbon nanotubes with an encapsulant material to form a mixture, depositing the mixture into a first tube, and drawing the first tube including the mixture into a drawn fiber at an elevated temperature so that the plurality of carbon nanotubes attain a first average alignment in a drawing direction. The drawn fiber is cut transversely to form a plurality of fiber segments, where each fiber segment includes a portion of the plurality of carbon nanotubes, and the fiber segments are bundled together to form a bundle of fiber segments. The bundle of fiber segments is drawn into a drawn bundle at the elevated temperature. The plurality of carbon nanotubes attain a second average alignment in the drawing direction within channels of the drawn bundle, where the second average alignment is higher than the first average alignment, and an average resistivity per channel of the drawn bundle is at least about 27% lower than a resistivity of the drawn fiber.

DETAILED DESCRIPTION

A modified fiber drawing technique is used to simultaneously disperse and align carbon nanotubes (CNTs) within channels of a nonconductive matrix defined by adjacent drawn tubes. The method may permit a high density array of CNTs to be fabricated in a glass or polymer matrix, forming a composite with anisotropic electrical and/or thermal conductivity. Due to the alignment and dispersion of the CNTs along the length of the channels, the composite may be highly conductive along the channels in the axial direction, but substantially non-conductive in the transverse direction.

When glass tubes are used to form the nonconductive matrix, the CNTs may be exposed to temperatures of about 800° C. during drawing, and thus the thermal stability of the CNTs is a concern. To prevent the CNTs from burning up during the drawing process, the CNTs may first be encapsulated in an encapsulant, such as a sodium silicate powder, which protects the CNTs from oxidation. Advantageously, the encapsulant may be an electrically conductive material to improve the performance of the CNTs once aligned and dispersed within the nonconductive matrix.

The method of aligning and dispersing carbon nanotubes may include mixing a plurality of carbon nanotubes with an encapsulant material to form a mixture and depositing the mixture into a first tube, followed by drawing. The preparation of the mixture is described in greater detail in the following section.

Figure 1A:
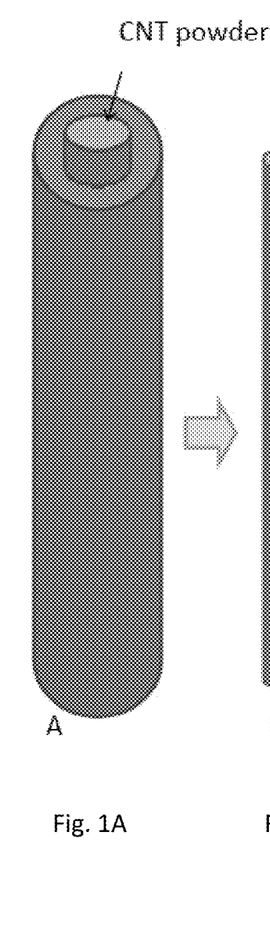
FIG. 1A is a schematic showing a tube containing a mixture of carbon nanotubes and an encapsulant.

Referring to FIG. 1A, the first tube, which includes the mixture of carbon nanotubes and encapsulant, is drawn into a drawn fiber at an elevated temperature. The elevated temperature employed for drawing depends on the material selected for the first tube, and is sufficient to cause softening of the material but is generally below the melting temperature. Due to the use of the encapsulant, the drawing may be carried out in air without substantially oxidizing the carbon nanotubes. During drawing, the diameter and the wall thickness of the first tube are decreased while its length increases, and the plurality of carbon nanotubes attain an increased average alignment in the drawing direction compared to the starting configuration of the CNTs. The drawing also has the effect of dispersing the carbon nanotubes along the length of the drawn fiber.

The drawn fiber is then cut transversely to form a plurality of fiber segments, where each fiber segment includes a portion of the plurality of carbon nanotubes deposited into the first tube. Generally, the transverse cuts are made substantially perpendicular to the longitudinal axis of the drawn fiber, although the drawn fiber may be cut at other angles if desired. The fiber segments formed by cutting the drawn fiber are bundled together, and the bundle may be subsequently deposited into a second tube for an additional draw. In some embodiments, the bundle may undergo the second or subsequent draws without first being deposited into a second (or nth) tube.

Figure 1B:
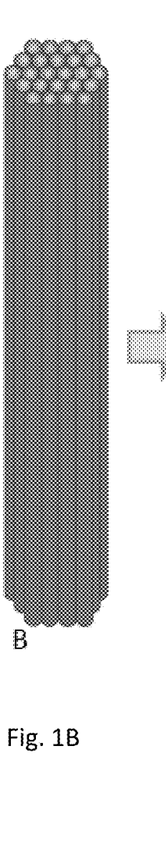
FIG. 1B is a schematic showing a bundle of drawn tubes.

Referring to FIG. 1B, the bundle of fiber segments undergoes the second draw at an elevated temperature, which is typically the same temperature as that employed for the first draw, to form a drawn bundle. The length of the second tube (if employed) and the fiber segments contained therein increases during drawing, while the diameter and the wall thickness of the second tube and the fiber segments decrease. Also during the second draw, the plurality of carbon nanotubes within the fiber segments attain a second average alignment in the drawing direction which is higher than the first average alignment, and the carbon nanotubes are further dispersed along the length of the channels of the drawn bundle. Due to the bundling of the fiber segments and the softening of the tube material surrounding the nanotubes and the encapsulant during drawing, the drawn bundle takes the form of a substantially continuous nonconductive matrix with longitudinal channels that contain the carbon nanotubes and the encapsulant. As with the first draw, the second draw may be carried out in air without detrimentally affecting the carbon nanotube network in the drawn bundle due at least in part to the presence of the encapsulant.

Figure 1C:
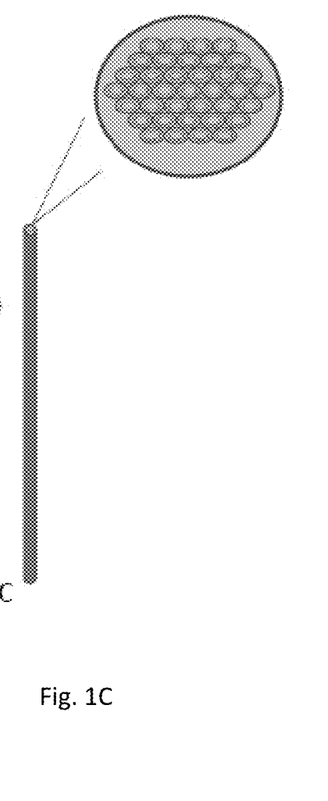
FIG. 1C is a schematic showing the bundle of drawn tubes after being deposited in a second tube and drawn again.

The drawn bundle may be cut transversely as described above to form a plurality of bundle segments, one of which is shown schematically in FIG. 1C, and then the bundling, the depositing, and the drawing may be repeated using the bundle segments in a third tube, or in an nth tube for successive draws. The bundle segments may also undergo a third or nth draw without first being deposited into a third or nth tube. The successive drawing contributes to the increased alignment and dispersion of nanotubes in the axial direction along the length of the channels. After drawing for a final time, which may be the third draw or the nth draw, where n is an integer between 3 and 10, the carbon nanotubes may be substantially dispersed within the channels along the length of the final drawn bundle and have achieved a final average alignment sufficient for percolation along the length in the dispersed state. After the final draw, the channels may extend in length from a few millimeters to tens of meters. With the fiber draw tower shown in FIG. 4, the dimensions are typically from a few millimeters to about one meter. As discussed further below, the electrical and/or thermal conductivity of the channels of the final drawn bundle may be enhanced due to the presence of dispersed and aligned carbon nanotubes along the length of the channels.

Figure 2A:
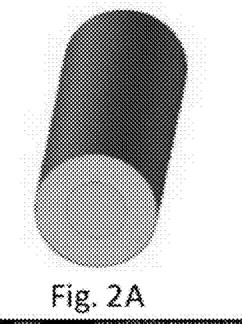
FIGS. 2A-2L show exemplary schematics and scanning electron microscope (SEM) images of: a single-channel drawn fiber obtained after a single draw (FIGS. 2A-2D), a drawn bundle including 140 channels obtained after two draws (FIGS. 2E-2H), and a final drawn bundle including 19,600 channels obtained after three draws (FIG. 2I-2L)
Figure 2B:
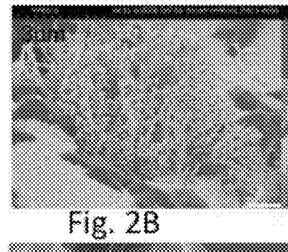
Figure 2C:
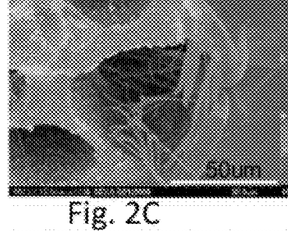
Figure 2D:
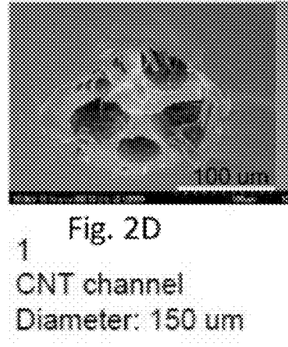
Figure 2E:
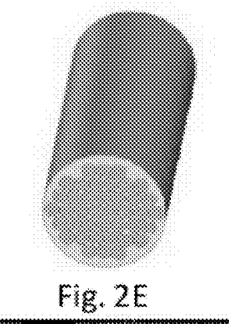
Figure 2F:
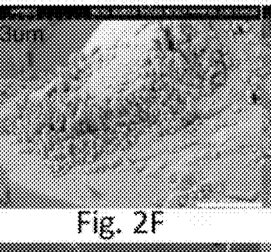
Figure 2G:
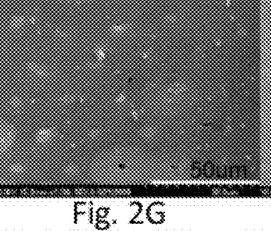
Figure 2H:
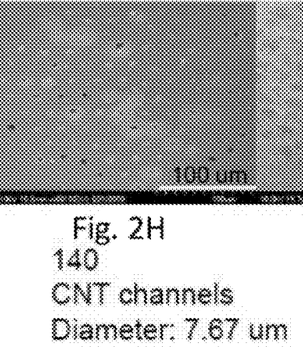
Figure 2I:
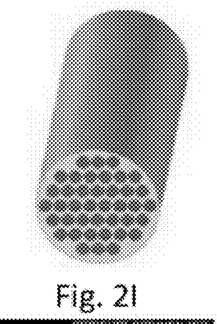
Figure 2J:
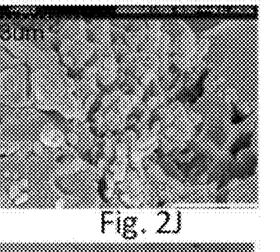
Figure 2K:
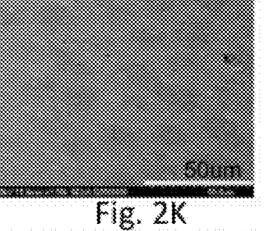
Figure 2L:
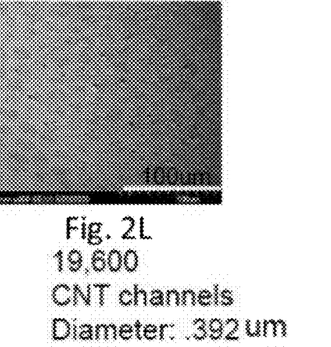

FIGS. 2A-2C show exemplary schematics and SEM images of a single-channel drawn fiber obtained after a single draw (FIG. 2A), a drawn bundle including 140 channels obtained after two draws (FIG. 2B), and a final drawn bundle including 19,600 channels obtained after three draws (FIG. 2C). In each figure the width or outer diameter of the drawn tube may be the same, for example, about 460 microns. However, the width or diameter of the channels included within the drawn tube decreases with each draw, from about 150 microns in this example after the first draw, to about 8 microns after the second draw, and then to about 0.4 micron (400 nm) after the third draw. Generally speaking, after the final draw, each channel may be no more than about 1 micron in width, or no more than about 500 nm in width. For some applications, the width of each channel after the final draw may be no more than about 250 nm, or no more than about 100 nm.

Furthermore, the spacing between adjacent channels, which depends on the wall thickness of the drawn tubes, decreases with each draw. Ultimately, the density of the CNT array depends on this spacing, which typically ranges from tens of nanometers to tens of microns. For example, a first tube having a starting wall thickness of about 2 mm may be drawn down to have a wall thickness of about 0.1 mm after one draw. After two draws the wall thickness may be about 0.005 mm (about 5 microns). Generally speaking, the spacing between adjacent channels of the final drawn bundle, or the wall thickness after the final draw, ranges from about 50 nm to about 250 nm.

The drastic reduction in the channel diameter and the spacing between channels with each draw allows an increasing number of drawn tubes to be bundled and drawn in successive draws. The final drawn tube may include a remarkably high number density of channels, where each channel contains carbon nanotubes substantially dispersed and aligned along its length. For example, a final drawn bundle may include about 20,000 channels within an area of about 500 microns (0.5 mm) in diameter. Or the 20,000 channels may reside within an area of about 250 microns (0.25 mm) in diameter. Generally speaking, the number density of channels within the final drawn bundle is at least about 100,000 channels/mm$^2$, and it may be at least about 250,000 channels/mm$^2$. In some embodiments, the number density of channels may be at least about 400,000 channels/mm$^2$.

Preparation of the Carbon Nanotube-Encapsulant Mixture

The encapsulant mixed with the carbon nanotubes prior to the drawing process may be a solid (e.g., a powder) or a liquid. To embed the CNTs in the encapsulant, the CNTs may be dispersed in a solution containing the encapsulant, or they may be mixed directly with the encapsulant. The encapsulant may be, for example, sodium silicate ($Na_2SiO_3$), also known as liquid glass; a high temperature polymer, such as a polyimide; a conductive polymer, such as poly(acetylene), poly(pyrrole), poly(thiophene), polyaniline, polythiophene, poly(p-phenylene sulfide), or poly(para-phenylene vinylene) (PPV); a surfactant, such as sodium dodecyl sulfate; a metal-organic material; or a metal, such as ruthenium, rhodium, palladium, silver, osmium, iridium, platinum, gold, or tantalum. As mentioned above, it may be advantageous for the encapsulant to be an electrically conductive material to enhance the conductivity of the nanotube network that forms during drawing. It may also be advantageous for the encapsulant to have a melting temperature that is lower than the drawing temperature to facilitate melting of the encapsulant as the fiber is drawn. There may be some situations in which CNTs are drawn without an encapsulant, such as when polymer tubes, which may be drawn at lower temperatures than glass tubes, are employed.

A thermal gravimetric analysis of the CNT-encapsulant mixture may be carried out with the goal of modeling the thermal behavior of the encapsulant material in the gas/temperature environment of the draw. Different thermal regimes may be evaluated to understand and minimize gas evolution, decomposition, etc., which can result in the formation of channel irregularities (e.g., gas bubbles, holes). Results from an exemplary thermal gravimetric analysis are described here.

Figure 3A:
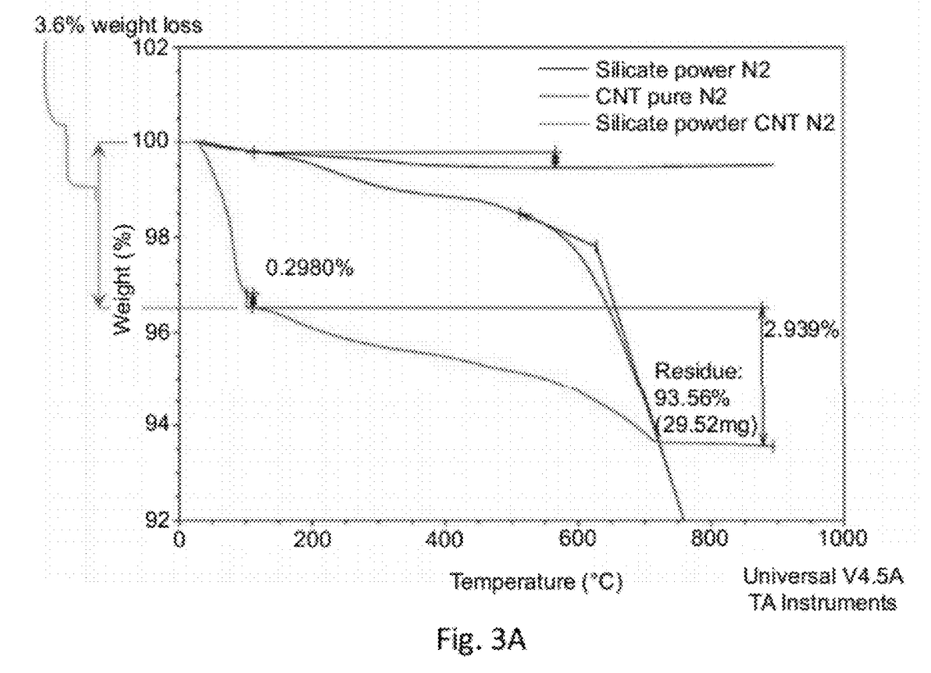
FIG. 3A is a plot obtained from a thermal gravimetric analysis of three samples.

FIG. 3A is a plot of weight (%) versus temperature (° C.) for exemplary samples of silicate powder in nitrogen 310, silicate powder including CNTs in nitrogen 320, and CNTs in nitrogen 330. The plot shows a weight loss of 3.6% over a change in temperature of about 120° C. due to absorbed water in the CNT-silicate powder. Assuming a 100 g sample of CNT-silicate powder, one can calculate that the powder can release up to 4.47 L of water vapor.

$$V = \frac{m}{\rho}$$

$$V_{water}^{vapor} = \frac{3.6 \text{ g}}{0.804 \text{ g/L}} = 4.47 \text{ L}$$

Thus, prior to depositing the mixture of carbon nanotubes and encapsulant into the first tube, the mixture may be heated to remove water at a temperature above 100° C. The heating may be carried out in an inert or partial vacuum atmosphere, for example, at a temperature and for a time duration sufficient to remove a substantially all of the water from the mixture. For example, the solution may be heated in an oven at about 500° C. for about 180 min. Care is taken to dehydrate the mixture because evaporation of water in the softened or semi-molten tube during the drawing process may create holes in the drawn fibers.

Figure 3B:
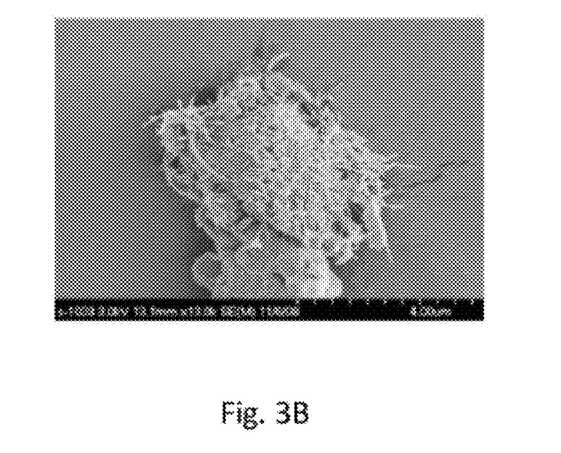
FIG. 3B shows an image of carbon nanotubes embedded in a grain of sodium silicate powder.

The forming of the mixture may also entail grinding the carbon nanotubes and the encapsulant into a fine powder to embed the nanotubes in the encapsulant material. A pestle and mortar, for example, may be employed to carry out the grinding. If the mixture is formed from an aqueous solution of the encapsulant, the grinding may occur after drying, as described above. FIG. 3B shows an image of CNTs embedded in a grain of sodium silicate powder following drying and grinding. The CNT-encapsulant mixture may be heated again after grinding to drive off more water. Once the mixture is placed in the first tube, it may be heated a final time, preferably under vacuum, to drive off any remaining water prior to drawing.

Drawing Process

Figure 4:
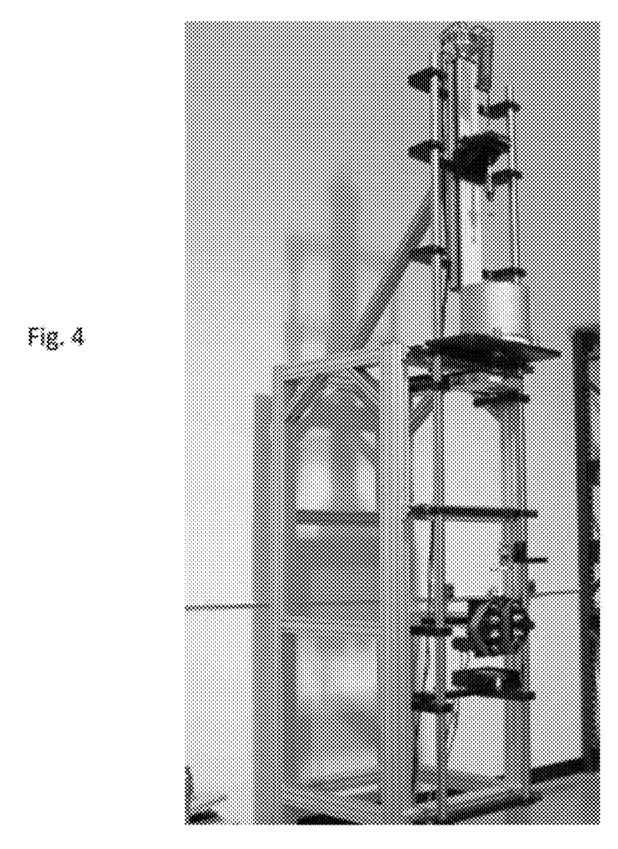
FIG. 4 shows an exemplary fiber draw tower (prior to the addition of vacuum and air lines) that may be employed to draw glass tubes containing carbon nanotubes into drawn fibers.

FIG. 4 shows a photograph of an exemplary fiber draw tower (prior to the addition of vacuum and air lines) that has been employed to draw glass tubes containing carbon nanotubes into drawn fibers. The top section holds and lowers the preform for drawing. A furnace underlies the top section, followed by a laser micrometer and traction pullers. At the base is a blade that cuts the drawn fiber into segments.

The first tube (and any successive tubes) employed in the drawing process may be a capillary tube made of a nonconductive material, such as a glass or polymer. Suitable glasses include, for example, borosilicate glass, and polymers such as polystyrene or polymethylmethacrylate may also be employed. Once loaded with the mixture for the first draw (or with the fiber/bundle segments for successive draws), the first (or nth) tube, which may be referred to as a preform, is heated until it softens and then is drawn down to a reduced outer diameter. Typically, the desired outer diameter is in the range of from about 0.1 mm to about 1 mm, or from about 0.25 mm to about 0.75 mm, to permit ease of handling. For example, an outer diameter of about 0.5 mm (500 microns) may be suitable. Prior to drawing, the preform may have an outer diameter in the range of from about 10 mm to about 40 mm, and thus a drawing ratio of from about 20 to about 70 is generally achieved, where the drawing ratio is equal to the starting outer diameter divided by final outer diameter. Typically, the glass capillary tube has inner and outer walls that define a circular transverse cross-section, although it is possible for one or both of the walls to have polygonal transverse cross-section (e.g., a hexagonal cross-section or a diamond-like cross-section). In this case, the outer diameter may be an outer lateral dimension (e.g., outer width), and the inner diameter may be an inner lateral dimension (e.g., inner width).

The preform is typically heated at a temperature sufficient to soften but not melt the material comprising the tube prior to drawing, so as to maintain the integrity of the tube during the drawing process. For a tube made of borosilicate glass, for example, the temperature may be in the range of from about 700° C. to about 900° C. Low temperature glasses such as soda lime glass may be heated to a temperature of about 450° C. to about 600° C. for drawing. If the tube is made of a polymer, the drawing temperature may be about 200° C. or less.

The feed rate of the preform and the pull rate of the drawn tube are balanced to achieve the proper tension and diameter at the drawing temperature. If the tension on the tube is too high, the drawn fiber may break, and if the tension is too low, the diameter of the drawn fiber may not be uniform. For example, a draw rate of from about 2 m/min to about 8 m/min is suitable. A starting length of the preform is typically in the range of from about 300 mm to about 1 m, although other lengths are possible. During the drawing process, the length of the preform may increase several-fold.

With each draw, the diameter of the CNT channels within the drawn tube is reduced while the number of channels increases, since additional fiber segments and then bundle segments are incorporated into successive preforms.

In an exemplary preparation and drawing process, CNTs are dispersed and encapsulated in a sodium silicate solution (0.01-1%), and then dried out in an oven at about 500° C. prior to grinding into a powder. Sometimes this process is repeated. A Duran capillary tube of 9 mm in outer diameter (OD) with a 3 mm or 2.2 mm inner diameter (ID) is then filled with about 13-18 inches (330 mm to 457 mm) of the CNT-sodium silicate powder. Sometimes the tube is heated overnight to further dry the sodium silicate. The drawing is typically performed between 850° C. to 910° C. The drawing rates range from 2-8 meters per minute. Second and third draws are generally performed at the same temperatures and draw rates. However, for the second and third draws, the preform is a bundle of fibers (e.g., about 140 fibers) from a previous draw placed inside a Duran tube, either a 9 mm OD/6 mm ID tube or 8 mm OD/6 mm ID tube. The target fiber diameter for all draws is about 0.46 mm. The fibers are cut at lengths of 300, 600 or 900 mm depending on the draw (first, second or third). An exemplary draw is carried out at 890-900° C. using a 9 mm/3 mm (OD/ID) tube at a draw rate of 2-4 m/min to form an exemplary CNT-glass composite.

Characterization and Properties of Exemplary CNT Array

Figure 5A:
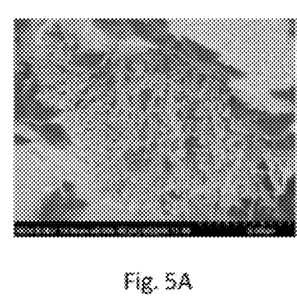
FIGS. 5A-5C are SEM images of fractured drawn fibers.
Figure 5B:
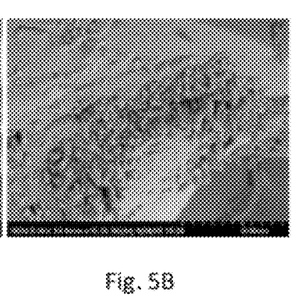
Figure 5C:
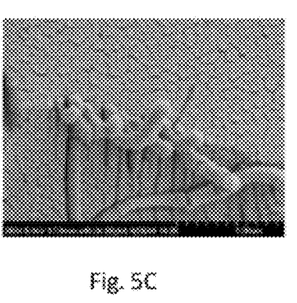

Scanning electron microscopy (SEM), confocal Raman mapping and impedance spectroscopy are used to characterize exemplary drawn glass fiber segments with channels that contain CNTs. SEM is used to analyze the alignment and dispersion of the CNTs. After each draw, the drawn fibers are fractured and the ends of the fiber may be observed using the SEM. The results are shown in FIGS. 5A-5C. After the first draw, the CNTs are embedded in glass in a single large channel that is divided into multiple sub channels created by the sodium silicate. Unlike the channels, the sub channels are not uniform along the length of the fibers. CNTs observed in the sub channels are still in large clumps, as shown in FIG. 5A. After a second draw, more channels are created due to the bundling process. The amount of CNTs across each channel is decreased due to the drawing process, which simultaneously compresses a cross-section of the preform and stretches it axially down the fiber length, causing the CNTs to disperse along the fiber length. This causes fewer CNTs to be found clustered together, as observed in the change from each sequential draw, FIGS. 5B and 5C. Additionally these forces in the drawing process cause the CNT to align axially with the fibers.

Figure 6:
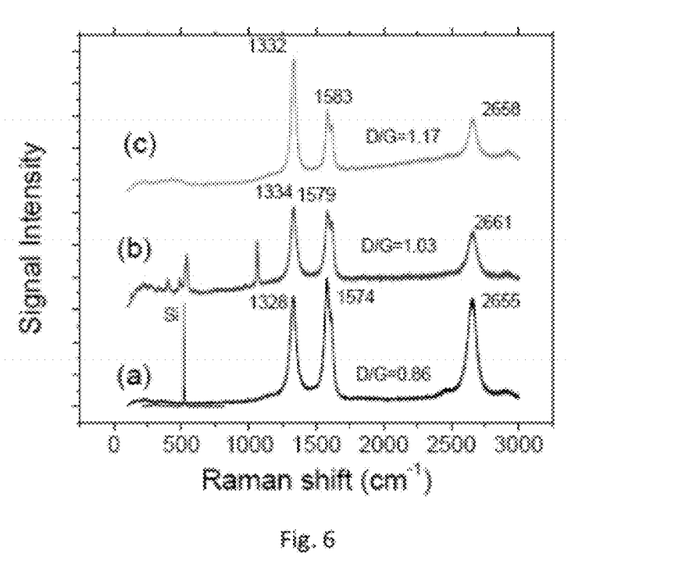
FIG. 6 shows changes in the Raman scattering spectrum of multiwall carbon nanotubes through processing stages (a), (b), and (c)

FIG. 6 shows changes in the Raman scattering spectrum of multiwall carbon nanotubes through processing stages. The lower Raman spectrum (a) from pristine multiwalled carbon nanotubes exhibits characteristic bands of tangential stretching G mode around 1580-1570 cm$^{-1}$, and the double resonance feature around 1330 cm$^{-1}$ (D mode) usually is used as a measure of disorder originated from defects or amorphous carbon. The G' band observed around 2600-2700 cm$^{-1}$ is basically a second harmonic of the D band and appears at doubled frequency of the D band. While quantitative characterization of the defects is difficult, the ratio of intensities of the D and G bands may be used as a measure of disorder/defects in the sample. The middle Raman spectrum (b) is obtained from Na silicate-MWNTs sonicated and spin casted on the glass, and the upper Raman spectrum (c) is obtained from MWNTs inside glass drawn fiber after a second draw. The small increase in the ratio of the D and G intensities through processing suggests only a small increase in the density of defects (e.g., from oxidation). Accordingly, the Raman data indicate that the drawing process does not lead to a significant increase in defect density.

Figure 7A:
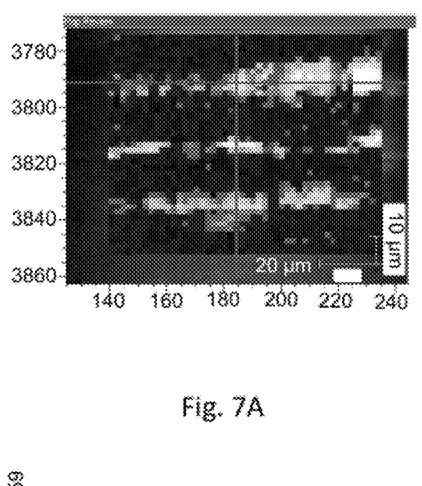
FIGS. 7A-7D show XY Raman mapping and integrated intensities of the G band of CNTs (1600 cm$^{-1}$) inside a drawn glass-CNT composite.
Figure 7B:
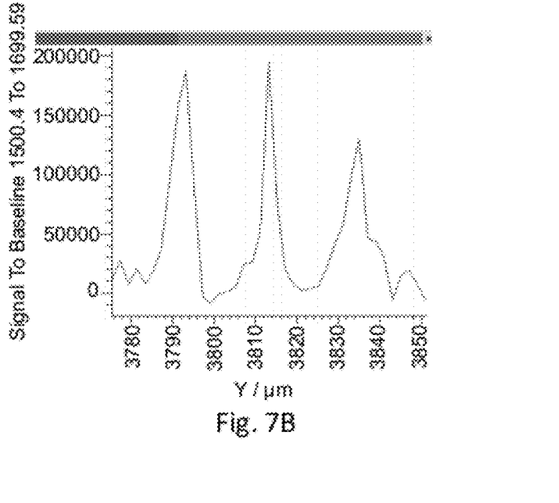
Figure 7C:
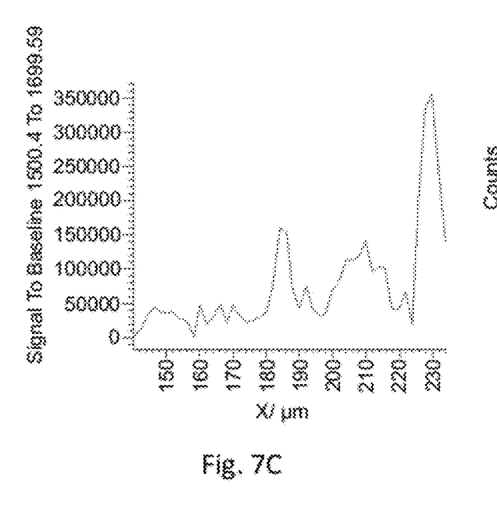
Figure 7D:
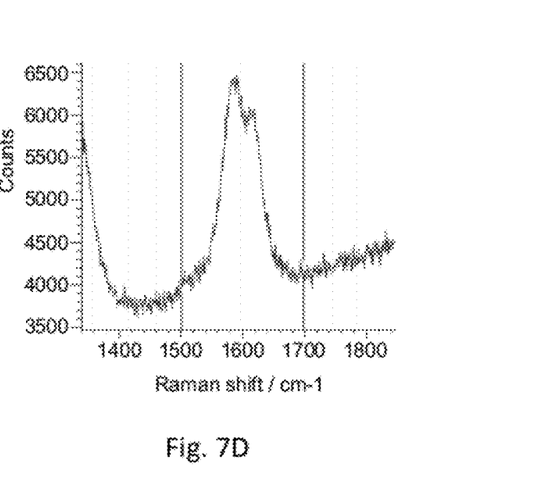

FIGS. 7A-7D show XY Raman mapping of the CNTs inside a drawn glass-CNT composite. The excitation is with a 633 nm laser polarized parallel to the fiber axes. The Raman map of FIG. 7A was obtained by integrating the area under the G and D bands of the CNTs (from 1520-1670 cm$^{-1}$). The map indicates some nonuniformity in the distribution of the CNTs inside the glass, where aggregates of CNTs are shown in regions of high brightness. The CNT channel has a diameter of about 10 microns (width of the peaks in 7B), with aggregates of around 10-20 microns in size. The Raman spectrum of FIG. 7B shows the integrated intensity of the G band in the y direction, and the spectrum of FIG. 7C shows the integrated intensity of the G band in the x direction. The FIG. 7D shows a Raman spectrum for a single point where the x and y scans meet in FIG. 7A.

Figure 8:
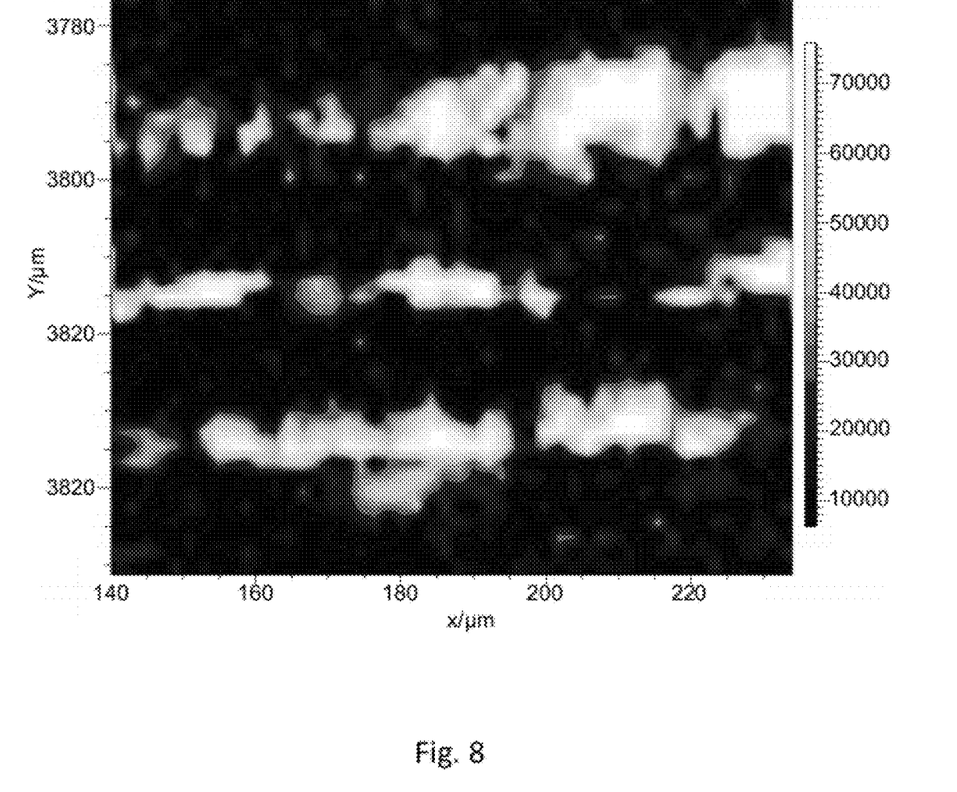
FIG. 8 shows an XY Raman map of the G band of CNTs (1600 cm$^{-1}$) inside a drawn glass-CNT composite.

FIG. 8 shows an XY Raman map of the intensity of the G band of the CNTs (1600 cm$^{-1}$) inside the drawn glass-CNT composite. The excitation is with 633 nm laser polarized parallel to the fiber axes. The map indicates some nonuniformity in the distribution of the CNTs inside the glass, where aggregates of CNTs are indicated by regions of high brightness. Despite the nonuniformities, the drawn glass-CNT composites provide significant improvements in conductivity compared to glass tubes alone, as discussed below. With further refinements of the structure to increase the alignment and the uniformity of the dispersion of the CNTs along the length of the drawn glass-CNT composite, the conductivity is expected to reach even higher values.

To evaluate the electrical conductivity of the drawn glass-CNT composites, channels of 2 cm-long fiber samples are electrically connected with silver paste, and the electrical properties of the fibers are measured in a two-electrode configuration in a 0.1 Hz to 1 MHz frequency range using a Zahner IM6 impedance spectroscopy system with high impedance current and voltage probes.

Figure 9:
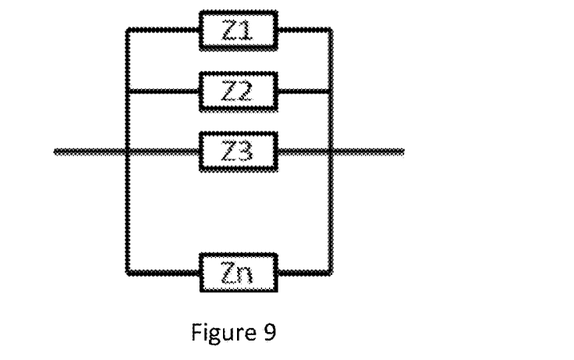
FIG. 9 shows an equivalent circuit that represents a multi-channel CNT glass or polymer composite.

Referring to FIG. 9, an equivalent circuit of a CNT-glass multichannel composite can be represented as impedances of individual channels connected in parallel. Assuming that individual channels have similar impedance values ($Z_1 = Z_2 = \ldots = Z_n = Z_{ind}$, where $Z_{ind}$ is the impedance of individual conducting channels and n is the number of conducting channels), and considering that during measurements all channels are electrically connected to form an equivalent circuit of individual impedances ($Z_{ind}$) connected in parallel, then $$1/Z_{eq} = 1/Z_1 + 1/Z_2 + \ldots 1/Z_n$$

where $Z_{eq}$ is impedance of the multichannel CNT-glass composite. The equivalent impedance of the CNT-glass multichannel sample may also be written as:

$$Z_{eq} = \frac{1}{n} \cdot Z_{ind}$$

In a low frequency approximation, the equivalent DC resistance of the multichannel sample may be written as:

$$R_{eq} = \frac{1}{n} \cdot R_{ind}$$

And the DC resistance of an individual channel ($R_{ind}$) may be written as:

$$R_{ind} = n \cdot R_{eq}$$

Figure 10:
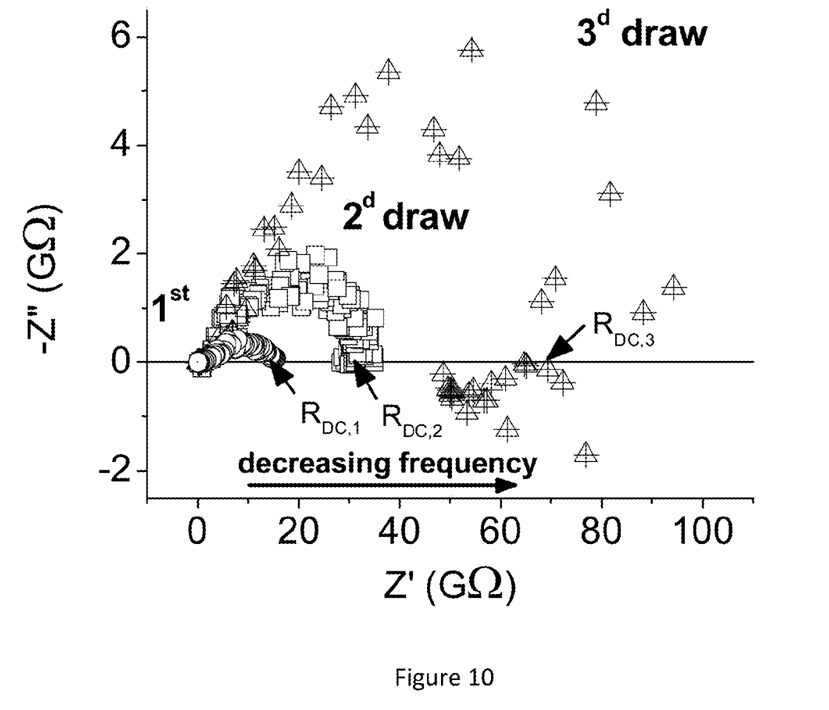
FIG. 10 is a graph of impedance data obtained from impedance spectroscopy measurements of a multichannel CNT-glass composite.

Referring to FIG. 10, the electrical properties of the multichannel CNT-glass composite fibers are characterized using impedance spectroscopy in the 0.1 Hz-1 MHz frequency range. The DC resistance of the fibers may be obtained from the intercept of the semicircle and the real impedance axis (Z') at low frequencies. The first drawn sample exhibits a DC resistance ($R_{DC,1}$) of about 15 GΩ. The second drawn sample, which has 140 multiwall CNT channels, shows a DC resistance ($R_{DC,2}$) of about 30 GΩ. The third drawn sample, which has 19,600 MWNT channels, exhibits a DC resistance ($R_{DC,3}$) of 70 GΩ.

The DC resistance of the individual channels after the first, second and third draws is estimated to be 15 GΩ, 4.20×10³ GΩ and 1.37×10⁶ GΩ, respectively, as summarized in Table 1. Using the formula for calculating the resistance of a wire, the resistance (R) of an individual channel can be expressed in terms of the silicate-CNT resistivity (ρ), channel cross section (A), channel diameter (d) and channel length (L) as:

$$R = \frac{\rho \cdot L}{A} = \frac{4 \cdot \rho \cdot L}{\pi \cdot d^2}$$

For samples of the same length and resistivity, the following relationship can be derived:

$$R_1/R_2 = \frac{\rho_1 \cdot L_1 \cdot A_2}{A_1 \cdot \rho_2 \cdot L_2} \approx \frac{d_2^2}{d_1^2} = \left(\frac{d_2}{d_1}\right)^2$$

The channels may be treated as single wires where the diameter of each channel is the wire diameter d. The diameter of the channel decreases by a factor of 20 after each draw; thus, a correction factor $R_n/R_{n+1}$ of 400 may be applied for each consecutive draw, Using the preceding equation, the resistivity of the individual channels was calculated and found to decrease after each consecutive draw, changing from 1.32×10⁴ Ω·m after the first draw to 8.28×10³ Ω·m after the third draw, as shown in Table 1. The 20-fold decrease in the size of a channel during consecutive draws improves (decreases) the resistivity of the individual channels on average by about 27% after the second draw and about 38% after the third draw. It is believed that the successive drawing contributes to the increased alignment and dispersion of nanotubes in the axial direction along the length of the channels. Accordingly, the electrical conductivity of the individual channels of the final drawn bundle is enhanced compared to the conductivity of the single channel of the first drawn fiber.

Preferably, the resistivity of the individual channels decreases on average by about 27% or more after the second draw. In other words, the resistivity per channel of the drawn bundle is on average at least about 27% lower than the resistivity of the single channel of the drawn fiber. For example, the average resistivity per channel of the drawn bundle may be about 9700 Ωm or less. Advantageously, the resistivity of the individual channels decreases on average by about 30% or more after the second draw. Ideally, the average resistivity per channel decreases by about 35% or more after the second draw, or by about 40% or more after the second draw. For example, the average resistivity per channel of the drawn bundle may be about 9000 Ωm or less, about 8500 Ωm or less, about 8000 Ωm or less, or about 7500 Ωm or less.

TABLE 1

| Draw type | Number of channels | Channel diameter, μm | Resistance of individual channel, GΩ | Channel Resistivity, Ωm | Conductivity of individual channel, (Ωm)⁻¹ | Improvement individual channel conductivity, % |
|---|---|---|---|---|---|---|
| Single | 1 | 150 | 15 | 1.32 × 10⁴ | 7.55 × 10⁻⁵ | — |
| Double | 140 | 7.67 | 4.2 × 10³ | 9.7 × 10³ | 1.03 × 10⁻⁴ | 27 |
| Triple | 19,600 | 0.392 | 1.372 × 10⁶ | 8.3 × 10³ | 1.21 × 10⁻⁴ | 38 |

After the final draw, the resistivity of the individual channels preferably decreases by about 38% or more on average compared to the resistivity of the single channel after the first draw. In other words, the average resistivity per channel of the final drawn bundle is at least about 38% lower than the resistivity of the single channel of the drawn fiber. For example, the average resistivity per channel of the final drawn bundle may be about 6500 Ωm or less. Advantageously, the average resistivity of the individual channels decreases by about 45% or more after the final draw. Ideally, the average resistivity per channel decreases by about 50% or more after the final draw, or by about 55% or more after the final draw. For example, the average resistivity per channel of the final drawn bundle may be on average about 7000 Ωm or less, about 6500 Ωm or less, or about 6000 Ωm or less.

The conductivity of the individual channels may be calculated as the inverse of the channel resistivity. Referring again to Table 1, the conductivity of the individual channels, or the average conductivity per channel, rises from 7.55×10⁻⁵ (Ωm)⁻¹ after the first draw to 1.03×10⁻⁴ (Ωm)⁻¹ after the second draw, and then to 1.21×10⁻⁴ (Ωm)⁻¹ after the third draw. Advantageously, the average conductivity per channel after the final draw is at least about 1.3×10⁻⁴ (Ωm)⁻¹, or at least about 1.5×10⁴ (Ωm)⁻¹. The chemical nature of the material during the draw remains substantially the same as indicated by the above-mentioned Raman spectroscopy data, which showed no appreciable oxidation of the CNTs.

Figure 11A:
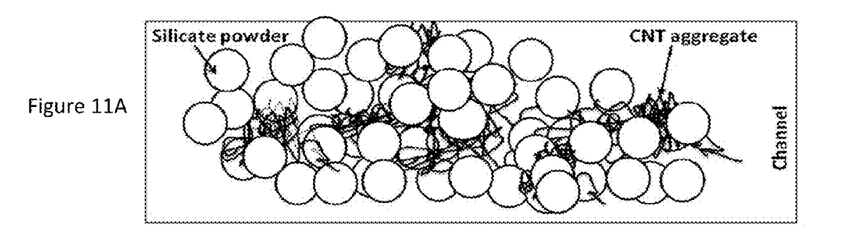
FIGS. 11A-11B are schematics of a channel before (11A) and after (11B) glass-drawing depicting a possible mechanism of improved single channel resistivity based on shear-based alignment of CNT aggregates and increased fraction of CNTs due to incorporation of silicate powder into the walls.
Figure 11B:
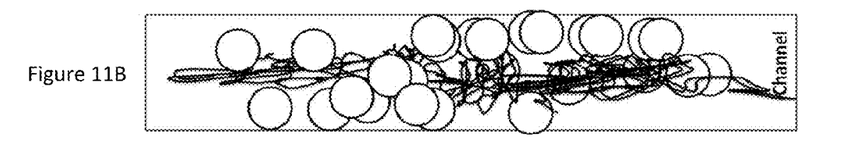

One possible reason for the improved bulk conductivity of the individual channels is the effective increase in the fraction of the CNTs as a result of debundling and lengthening of bundled aggregates and changes in the encapsulant material (e.g., silicate powder). The inventors believe that silicate powder inside the channels may soften or melt at the drawing temperatures and fuse into glass while the CNTs remain inside the channels. This may lead to an effective increase of the CNT fraction of the CNT-silicate material inside the channels. FIGS. 11A and 11B show a representation of the proposed mechanism of improved single channel conductivity based on shear-based alignment of CNT aggregates during the glass drawing process. Establishing a concentration of CNTs in the dispersant powder above the percolation threshold in the first drawn sample may be important to obtaining high conductivity of multi-channel CNT-glass composites.

A method to disperse and align CNTs in glass or polymers may be advantageous for various applications. Aligned carbon nanotubes in glass or plastic may offer an easy route to create anisotropic thermal and/or electrical conductors suitable for use in electronic devices or sensors. For example, an array of aligned CNT field emitters could lay the foundation for a new generation of high definition displays, such as FEDs. In another example, a material with anisotropic conductivity could be employed as an artificial polymeric skin for an advanced prosthetic device. CNT-based heat sensors below the polymer surface could very quickly detect temperature changes directly above the surface and adjacent to the sensors, while remaining relatively insensitive to temperature fluctuations away from the surface.

Although the present invention has been described in considerable detail with reference to certain embodiments thereof, other embodiments are possible without departing from the present invention. The spirit and scope of the appended claims should not be limited, therefore, to the description of the preferred embodiments included here. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. An array of aligned and dispersed carbon nanotubes, the array comprising:
    an elongate drawn body including a plurality of channels extending therethrough from a first end to a second end of the body, the channels having a number density of at least about 100,000 channels/mm$^2$ over a transverse cross-section of the drawn body;
    a plurality of carbon nanotubes disposed in each of the channels, the carbon nanotubes being sufficiently dispersed and aligned along a length of the channels for the array to comprise an average resistivity per channel of about 9700 $\Omega$m or less, and further comprising an encapsulant material disposed adjacent to the carbon nanotubes in the channels, the encapsulant material having been employed to minimize oxidation of the carbon nanotubes during drawing of the body,
    wherein the encapsulant material is selected from the group consisting of: sodium silicate, polyimide, poly (acetylene), poly(pyrrole), poly(thiophene), polyaniline, polythiophene, polyp-phenylene sulfide), poly (para-phenylene vinylene) (PPV), sodium dodecyl sulfate, a metal-organic material, ruthenium, rhodium, palladium, silver, osmium, iridium, platinum, gold, and tantalum.

2. The array of claim 1, wherein the encapsulant material comprises an electrically conductive material.

3. The array of claim 1, wherein each channel has a width of about 500 nm or less.

4. The array of claim 1, wherein the drawn body has a width of about 500 microns or less.

5. The array of claim 1, wherein a spacing between adjacent channels is defined by a wall thickness of adjacent drawn tubes.

6. The array of claim 5, wherein the spacing between adjacent channels lies in the range of from about 50 nm to about 250 nm.

7. The array of claim 1, wherein the elongate drawn body comprises an electrical insulator.

8. The array of claim 7, wherein the electrical insulator comprises a glass.

9. The array of claim 7, wherein the electrical insulator comprises a polymer.

10. The array of claim 1, wherein the average resistivity per channel is about 8300 $\Omega$m or less.

* * * * *